United States Patent [19]

Honda et al.

[11] 4,290,455
[45] Sep. 22, 1981

[54] REED VALVE

[75] Inventors: Shoichi Honda, Tokyo; Nobuyoshi Watanabe, Omiya, both of Japan

[73] Assignee: Honda Giken Kogyo Kabushiki Kaisha, Tokyo, Japan

[21] Appl. No.: 49,734

[22] Filed: Jun. 18, 1979

[30] Foreign Application Priority Data

Jun. 28, 1978 [JP] Japan .................................. 53-78278

[51] Int. Cl.³ .............................................. F16K 15/14
[52] U.S. Cl. ................................ 137/855; 137/512.15
[58] Field of Search ................... 137/512.15, 855, 856, 137/857, 858

[56] References Cited

U.S. PATENT DOCUMENTS 949,070  2/1910  Gutermuth .......................... 137/857
3,994,319 11/1976 Airhart .............................. 137/855
4,193,424  3/1980 Hrabal .............................. 137/855

FOREIGN PATENT DOCUMENTS 957323 12/1947 France ................................ 137/855

Primary Examiner—William R. Cline
Attorney, Agent, or Firm—Lyon & Lyon

[57] ABSTRACT

A reed valve in the form of a plate fixed at one end and bendable into and out of contact with a valve seat is operated by differential pressures and acts as a check-valve. The reed valve has cavities in the surface thereof with unitary strengthening frame members separating these cavities. Specific patterns of cavities and frame members are employed to achieve the desired performance of the valve.

17 Claims, 19 Drawing Figures

REED VALVE

BACKGROUND OF THE INVENTION

The present invention is directed to reed valves. More specifically, the present invention is directed to the design and construction of the elements of a reed valve.

Reed valves are simple, high performance one-way valves which can be used in a variety of contexts. They have recently been employed with substantial success in two-stroke engine design. High performance two-stroke engines such as employed on motorcycles have been developed which employ a reed valve in performing at least part of the valving function more traditionally performed solely by porting in the engine cylinder. As combusting gases are not required to pass through such valves, and as high r.p.m. requirements are needed, the reed valve has been found to be well suited to two-stroke engine design.

The traditional reed valve as employed on internal combustion engines is illustrated, for purposes of explanation, in FIGS. 17, 18, and 19 herein. Considering the problems of heat-resistance, corrosion resistance, wear resistance, etc., reed valves 10 have been generally formed from flat plates of stainless steel material or its equivalent. This plate is attached at its base end with one or more fasteners 12 to a valve port 14 located through the body of the reed valve system with which the valve is associated.

The reed valve 10 acts as a check valve because the valve element extends beyond the rim of the port 14 as can best be seen in FIG. 18. In the context of an engine, the carburetor and intake assembly would be to the right of the valve 10 while the left side is associated with the air-fuel mixture compression chamber. The valve operates on differential pressure, primarily induced by the creation of vacuum on the left side of the valve as it is shown in FIG. 18. As two-stroke engines are expected to run at relatively high speeds, the valve must open and close very rapidly with each revolution of the engine. During compression of the air fuel mixture in the compression cavity, the valve 10 must move to the right as seen in FIG. 18 to prevent mixture from escaping through the carburetor. During charging of the compression chamber of the engine, the valve 10 must move to the left, off the seat, so that air-fuel mixture may flow into the engine.

The performance required of such reed valves creates problems associated with both the structure and the operation of these devices. In order to achieve quick, responsive movement, the valve must be light. It must also exhibit the appropriate spring rate, be resistant to corrosion, be strong enough to withstand the gas pressures experienced and withstand the repeated vibration of its operation. One specific difficulty which can develop is that the satisfaction of certain other of the requirements listed results in the valve operating in a engine speed range which includes the natural frequency of the valve. A resonance can develop which results in the independent vibration of the reed valve. Such resonance in turn results in the imperfect seating of the valve and improper movement not in time with the engine. As a consequence, engine output can be adversely affected. Also, the structural integrity of the reed valve itself may be detrimentally affected.

The repetitive vibrational movement, whether caused by resonance or simply repeated gas pressure loads, can result in fatigue failure of the reed valve when thin walled construction is applied as a possible solution to certain performance requirements. Consequently, thin walled construction has been avoided because of the resulting problems with tearing of the valve material, etc. As a result of the foregoing difficulties, the relatively simple reed valve has found difficulty in providing satisfactory performance in high-speed, two-stroke engines.

SUMMARY OF THE INVENTION

The present invention is directed to reed valves particularly suited for high-speed performance such as required in two-stroke engines. Valves of the present invention are to be designed with natural frequencies well above the operating frequencies expected of the valve. Extraneous detrimental vibrations are thereby avoided. The advantages of valves having a high natural frequency are realized by the present invention without the detrimental performance and structural aspects generally associated with light-weight valve construction. The reed valves of the present invention employ plates of appropriate thickness for wear, corrosion, spring rate and strength. At the same time, cavities are provided in at least one of the surfaces of the reed valve to reduce weight.

The cavities are substantially structurally independent of one another by virtue of the presence of raised portions of the reed valve referred to as frame members. The frame members make the cavities discontiguous and lend overall strength to the valve. The cavities are also formed for maximum weight reduction and minimum structural effect. To this end, the cavities are arranged to form a nested pattern of symmetrical figures where those figures are generally rounded or polygonal with obtuse included angles. The cavities are arranged and appropriately truncated so as to form an outer planar peripheral boundry forming a planar surface having continuity with the frame members. To avoid uneven stress distribution, the cavities are spaced such that the frame members are of the appropriate thicknesses for creating a substantially constant resistance to the bending of the valve. When cavities are placed on both sides of the valve, they are of equal depth to place the neutral stress axis at the center of the valve plate. The patterns of cavities on each side of the valve are offset so that a cavity on one side of the valve has a frame member extending through the center of it on the other side of the valve. These several features each provide a means by which a light-weight reed valve can be employed in high performance applications without the disabilities normally associated with thin walled reed valves.

It is therefore an object of the present invention to provide a high performance reed valve system having a high natural frequency beyond the range of the cycle frequency of operation of the valve. At the same time, it is an object of the present invention to provide improved performance of the valve without adversely affecting the size, weight, and structural capabilities of such a valve. Other and further objects and advantages will appear hereinafter.

DETAILED DESCRIPTION OF THE PREFERRED EMBODIMENT

As stated above, the natural frequency of the Reed Valve is an essential element to its proper operation in any given context. The natural frequency of such a reed element may be generally expressed by the following equation:

$$f = \frac{1}{2\pi} \sqrt{\frac{3E}{0.242 m l^3}}$$

$$= \frac{1}{2\pi} \sqrt{\frac{3E}{0.242 l^3}} \sqrt{\frac{I}{m}}$$

where
 f = natural frequency
 E = Young's modulus
 I = section modulus
 l = length of reed valve
 m = weight From the foregoing equations, it can be seen that the natural frequency of such a reed element is proportional to the square root of I/m when the size and material of the reed valve are fixed.

Figure 17:
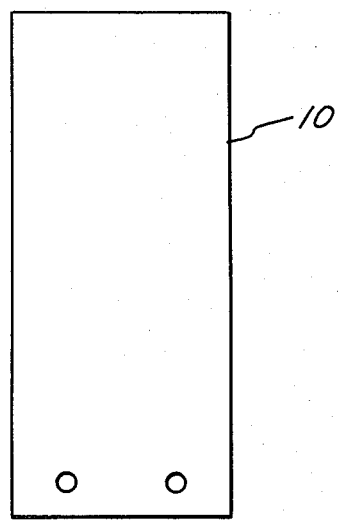
FIGS. 17, 18, and 19 are explanatory views of a conventional reed valve showing the valve in plan, in cross-sectional side view and in end view.
Figure 18:
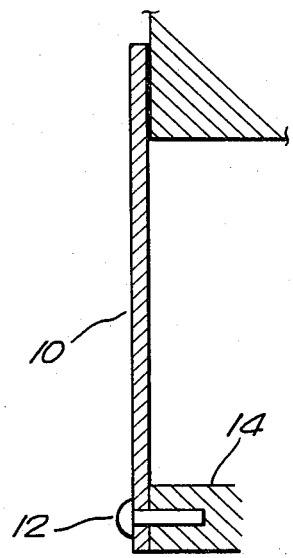
Figure 19:
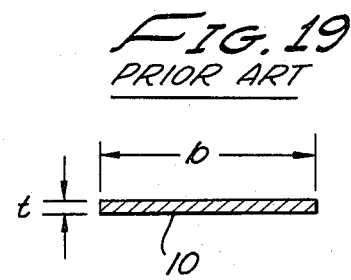

Assuming a conventional reed element such as illustrated in FIGS. 17-19, the area and section modulus may be determined as follows:

$$A = bt$$

$$I = bt^3/12$$

where
 A = cross sectional area
 b and t = width and thickness shown in FIG. 19

Figure 15:
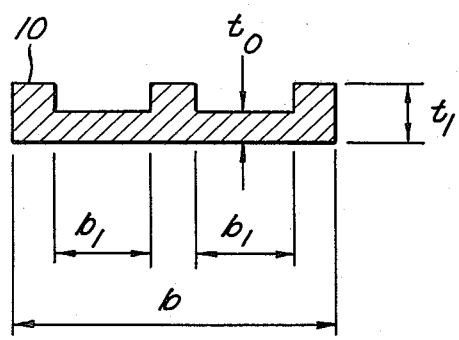
FIGS. 15 and 16 are cross-sectional views of two embodiments of reed valves of the present invention.
Figure 16:
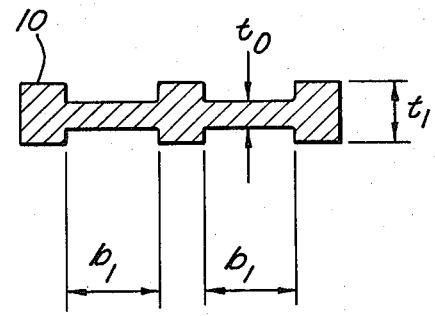

With the foregoing assumption that the body is of uniform cross-section, the weight m is proportional to the cross-sectional area. However, if the sectional contour of the reed valve 10 is instead provided with depressions and projections on one or both sides of the valve as is illustrated in FIGS. 15 and 16 while the area remains constant, the sectional modulus is increased. This fact is shown by an example using FIGS. 15, 16, and 19.

If $$t_0 = t/3$$

$$b_1 = b/3$$

because the area is constant, $$A = bt = 2b_1 t_0 + (b - 2b_1) t_1$$

$$= \frac{2}{9} bt + \frac{b}{3} t_1$$

$$t_1 = \left( bt - \frac{2}{9} bt \right) \frac{3}{b} = \frac{7}{3} t$$

Now, section modulus of a reed element having the aforementioned depressed and projected shape is expressed by the following equation:

$$I = 1/12 [2 b_1 t_0^3 + (b - 2 b_1) t_1^3]$$

In this equation, $t_0$ is t/3, $b_1$ is b/3 and, as obtained just now, $t_1$ is 7/3 t.

Placing these values in the equation for I, $$I = bt^3/12 \times 4.26$$

is obtained.

Thus, I becomes approximately four times larger as compared with that of a flat plate body expressed by the earlier example while the square root of I/m increases for the same material and same length. In this way, the natural frequency of the reed valve 10 increases with the appropriate projections and depressions. This increase is without additional weight as would be required with the simple reed valve shown in FIG. 17 using an increase of the thickness t.

As discussed immediately above, by providing either one or both sides of a reed valve 10 with depressions and projections and by making the reed valve of the same material, the same length, the same sectional area and the same weight as a simple plate, it is possible to increase the natural frequency of the reed valve. By this method, the natural frequency of the reed valve can be placed out of the range of the normal operating frequency of the valve. At the same time, the same functional performance of the valve can be obtained as that of a flat plate.

The general considerations applicable to the design of a proper reed valve include the following:

a. When cavities are employed in the surface of a reed valve as is contemplated by the present invention, the bottom of the cavity presents a thinner wall than the overall thickness of the reed valve. This bottom layer is susceptible to membrane vibration which can be detrimental to the integrity of the valve. Consequently, it has been found that the natural frequency of such a thin walled section is preferably higher than the natural frequency of the entire reed valve.

b. The same cavity bottom of thinner construction is also more susceptible to fatigue failure resulting from cyclical gas pressures. It is thus necessary to ensure that the stress applied to such thin walled portions of the reed valve are kept below the damaging stress level for such a membrane.

c. It is advantageous that the entire reed valve have a uniform strength, principally in resisting bending moments.

d. It is advantageous to avoid stress concentration due to sharp surface discontinuities.

e. The overall weight of the reed valve is desired to be as light as possible with a maximum section modulus for proper operation and high natural frequency valve.

Figure 1:
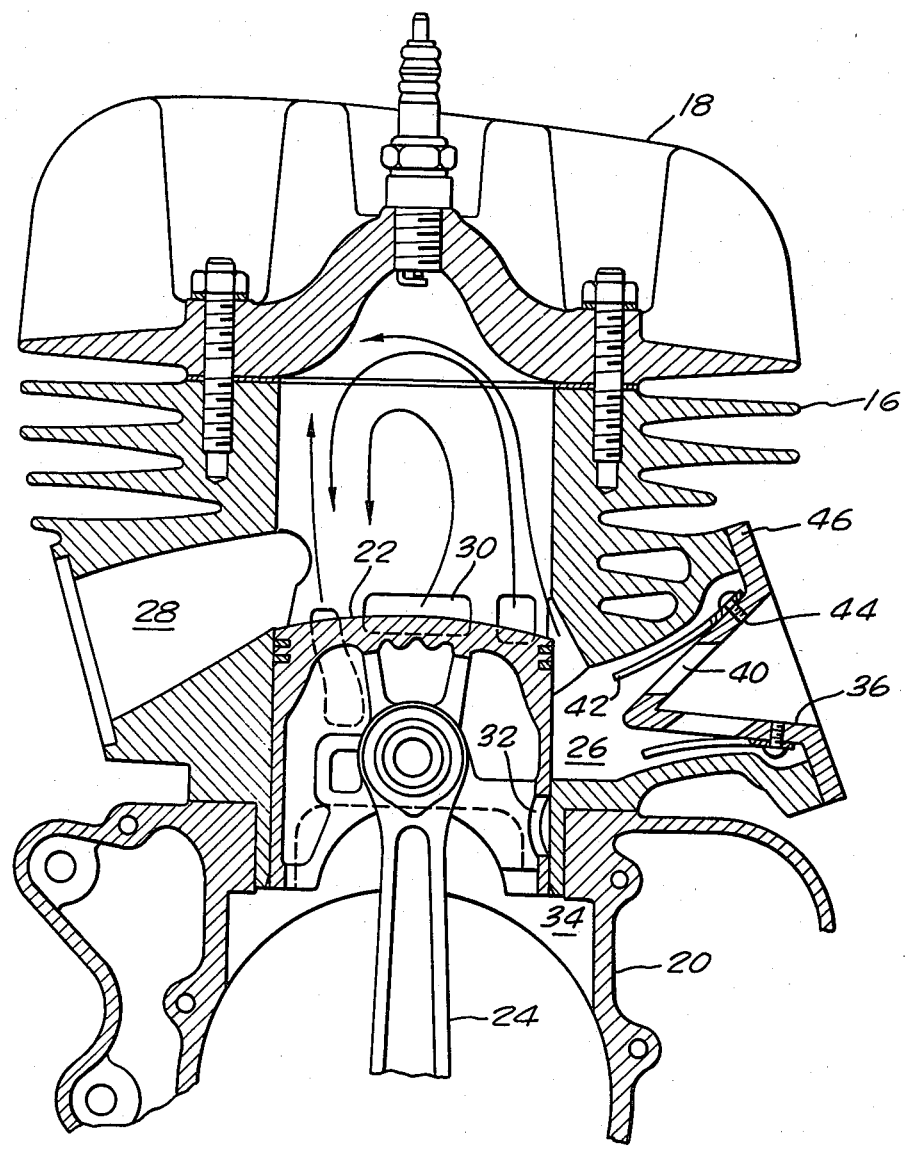
FIG. 1 is a cross-sectional elevation of a two-stroke internal combustion engine employing reed valves.

With the foregoing background, the specific devices of the preferred embodiment are here disclosed. Turning first to FIG. 1, an example of an internal combustion engine employing reed valves of the type disclosed herein is illustrated. The engine comprises a cylinder 16, a cylinder head 18, and a crank case 20. A piston 22, is slideably contained within the cylinder and connected to a crank shaft by means of a connecting rod 24. On the right side of the figure, an intake port 26 extends through the cylinder 16. The intake port 26 is associated with a carburetor (not shown). To the left of the cylinder in FIG. 1, an exhaust port 28 is illustrated which is connected to an exhaust pipe (not shown). Transfer ports 30 are shown through the cylinder wall between the intake port 26 and the outlet port 28 and a scavenging passage 32 is illustrated through the skirt of the piston 22. The passage 32 allows air-fuel mixture to flow to the compression area 34 of the engine.

The intake port 26 is controlled by a reed valve system 36. The reed valve system 36 includes a V-shaped valve body 38 having ports 40 through each side thereof. The outer wall of the V-shaped valve body 38 defines the valve seat around each of the ports 40. As many as three or more ports 40 may be positioned side-by-side on each side of the "V". Covering each bank of ports 40 is a reed valve 42 comprising as many reed elements as necessary to cover each of the ports. The reed valve 42 is held at a first end to the outside of the V-shaped valve body 38 by fasteners 44. The V-shaped valve body 38 has an outer flange 46 so that the reed valve system 36 may be rigidly fixed to the cylinder 16.

The valves 42 are shown to be open in FIG. 1.

The valves 42 are shown to be open in FIG. 1. However, the open condition only occurs when the gas pressures are such that a stainless steel valve is forced from its seat. During all other portions of the engine cycle, the reed valves 42 are closed to prevent flow out of the intake port 26 toward the carburetor.

Figure 2:
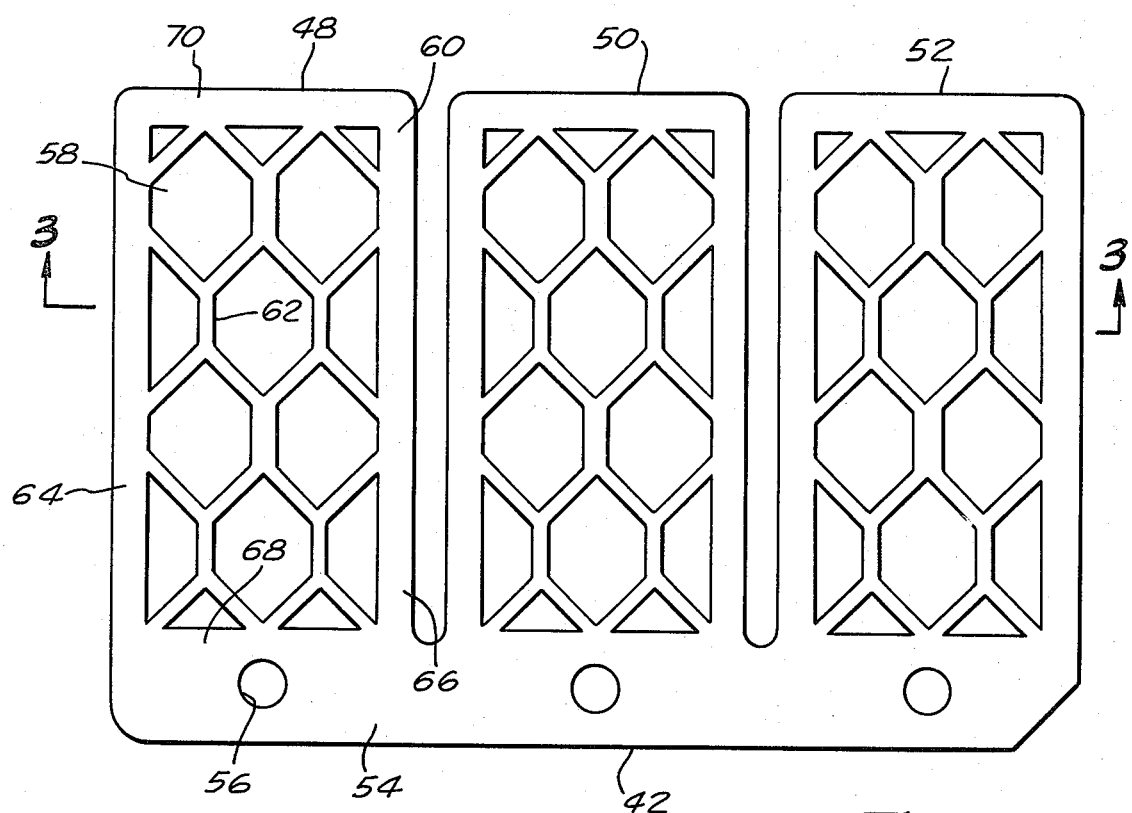
FIG. 2 is a plan view of a reed valve of the present invention.
Figure 3:
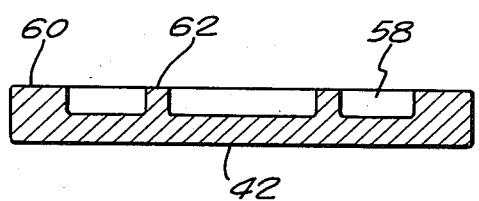
FIG. 3 is a cross-sectional elevation taken along line 3—3 of FIG. 2.
Figure 4:
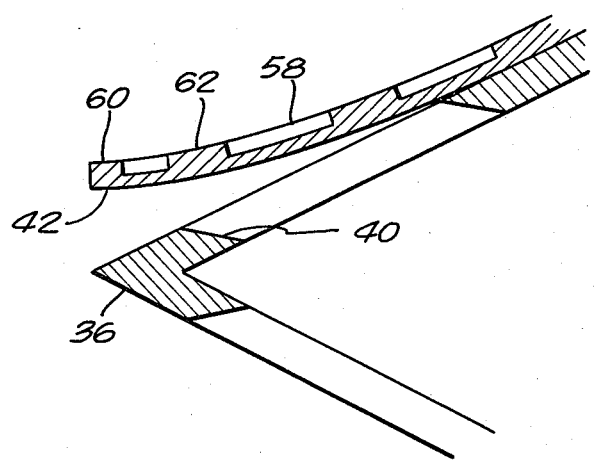
FIG. 4 is a cross-sectional elevation of a reed valve and reed valve seat.

Looking in detail to one embodiment of a reed valve of the present invention, FIG. 2 illustrates a reed valve 42 having three reed elements 48, 50, and 52. The number of reed elements provided is to be equal to the number of valve port openings 40. The reed valve 42 includes a base 54 by which the reed valve 42 may be held. In this embodiment, it is contemplated that screws will be employed as fasteners for fixing the base 54 to the V-shaped valve body 38. Consequently, holes 56 are provided.

Each of the reed elements 48, 50, and 52 are identical and are of unitary construction with the base 54. Cavities 58 are present in a first surface of each reed element. The cavities 58 are cut in such a way as to create a pattern of symmetrical figures in the surface. Between and and around the cavities 58, a planar peripheral boundry 60 and frame members 62 are positioned. The planar peripheral boundry 60 and the frame members 62 have surface continuity as the boundry 60 and frame members 62 all extend to the same height above the bottom of the cavities 58. The pattern thus defined between the cavities 58 divides the cavities such that they are mutually discontinguous and substantially structurally independent. In this way, stress is not developed across any gaps in the frame members 62 between cavities and any membrane resonances are contained independently within the bottom plate of each of the cavities. To obtain maximum lightness, the pattern of cavities is in a nested arrangement and there is no one straight line across the width of the element which is either all cavity or all frame member such that uneven stress can develop from uneven resistance to bending loads.

The pattern of cavities 58 extends to the planar peripheral boundary 60. In the embodiment of FIG. 2, the nested cavities 58 form a six sided polygon. Other shapes may be equally well suited to the present application. It is advantageous that each included angle at any corner of the full cavities 58 is obtuse. This reduces the stress concentration at these angles. The truncated cavities 58 are necessarily adjacent the peripheral boundary 60 which exhibits additional strength such that stress concentration at the intersection angles of the frame members 62 and the peripheral boundary 60 is not critical.

The reed elements may be identified in more detail by reference to the several sections of the peripheral boundary 60. The peripheral boundary 60 includes two sides 64 and 66 which are parallel and extend perpendicularly to the base 54. Adjacent the base and integral therewith is a boundary end 68. At the distal end of the reed element is a second boundary end 70 which is parallel to the first boundary end 68. Thus, the resulting pattern of cavities defines a substantially rectangular valve body surface within the planar peripheral boundary.

To further make uniform the stress throughout the element, the cavities 58 are of equal depth. The cavities are also sized such that a specific multiple of the width of a full cavity plus the included frame members fits between the sides 64 and 66 of the peripheral boundary 60. In the embodiment shown in FIG. 2, two cavities 58 fit between the sides 64 and 66. Because of the nested arrangement, alternate rows of cavities 58 have one cavity located in the center between the sides 54 and 56 with truncated cavities on either side thereof. In the rows with the centrally located cavity 58, frame members extend on either side thereof. To compensate for the presence of two frame members 62 in the rows containing the centrally located cavity 58, the frame member in the next row located between the two full cavities 58 is of double width. Thus, the sum widths of the frame members in any row of cavities between the ends 68 and 70 of the boundary 60 are substantially constant. All of these foregoing features help satisfy the considerations listed above in subparagraphs a through e. For example, the smaller the size and depth of the cavities 58, the better condition a, is satisfied. The narrower each cavity 58, the better it satisfies condition c. The obtuse intersection of the frame members 62 as measured by the included angle of the cavity corners aids in the satisfaction of condition d. The symmetry and nesting of the pattern of cavities 58 aids in the satisfaction of condition c.

Figure 5:
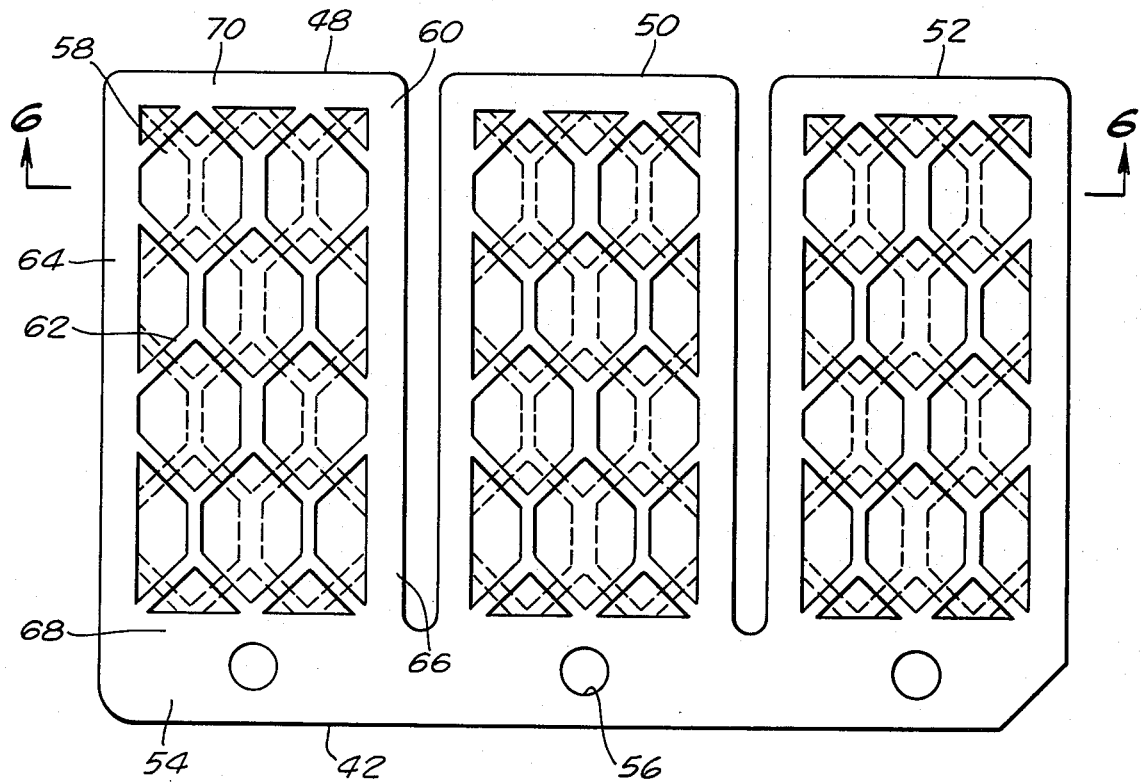
FIG. 5 is a plan view of a second embodiment of a reed valve of the present invention.
Figure 6:
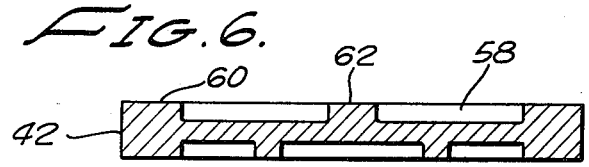
FIG. 6 is a cross-sectional elevation taken along line 6—6 of FIG. 5.

Looking then to the embodiment of FIG. 5, a reed valve substantially as shown in the embodiment of FIG. 2 is illustrated with the exception that the second surface, on the opposite side of the valve from the surface just described in detail, is also covered by cavities 58. Preferably, the patterns are identical but are offset by one half the pitch of the pattern. The offset is in a direction perpendicular to the base. The result of the offset of the pattern can be clearly seen in FIG. 5 where the bottoms of each of the cavities 58 are supported from beneath by a frame member in the pattern on the second surface. Naturally, the same is true of the cavities on the reverse side of the reed valve. This results in higher natural frequencies for the available membranes and a reduction in the deformation of these membranes caused by gas pressure if the patterns were in fact aligned.

Figure 7:
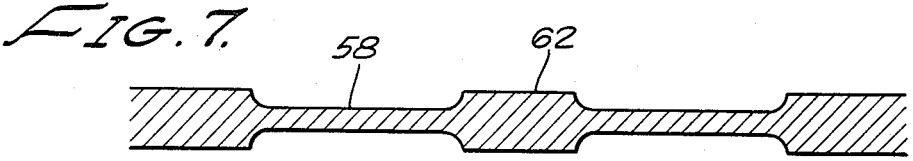
FIG. 7 is a detailed cross-sectional view of another reed valve of the present invention.
Figure 8:
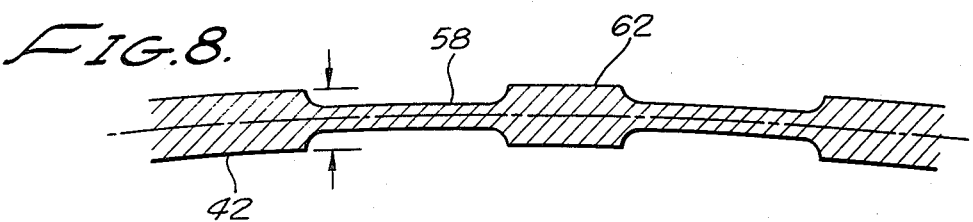
FIG. 8 is a cross-sectional elevation of the reed valve of FIG. 7 showing deformation thereof.

FIGS. 7 and 8 illustrate simplified versions of the reed elements where frame members intersect. It may be noted from FIG. 7 that a preferred form of the invention includes rounded intersections between the sidewalls of each of the cavities 58 and the bottom of each of the cavities to avoid excessive stress concentration. FIG. 8 illustrates the advantage of having the cavities 58 of equal depth on both sides of the reed element. In such a situation, the neutral stress axis is located centrally in the reed element to enhance the strength of the device. Where cavities 58 are not provided on both sides of the reed element, consideration in the development of a pattern must be given to the offset of the thin membranes forming the bottoms of the cavities from the neutral axis.

Figure 9:
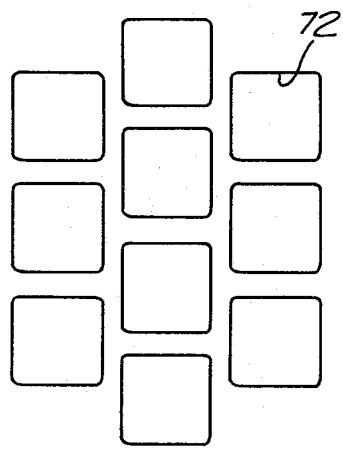
FIGS. 9, 10, 11, and 12 illustrate alternate patterns for cavities in the surface of a reed valve according to the present invention.
Figure 10:
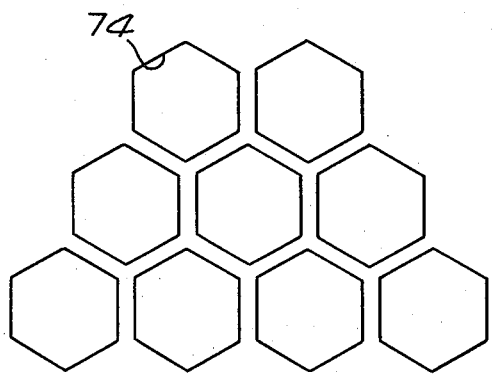
Figure 11:
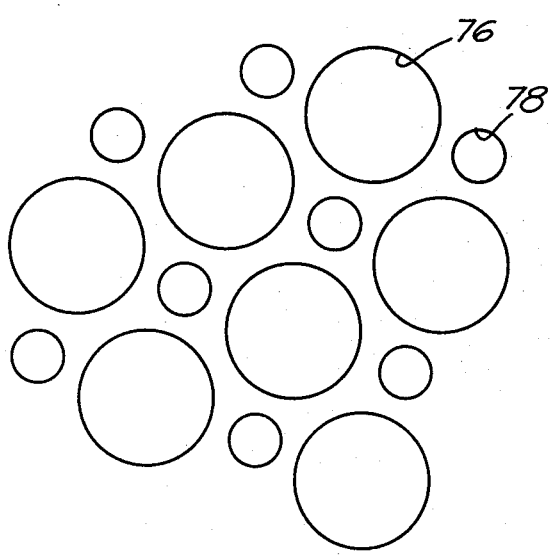
Figure 12:
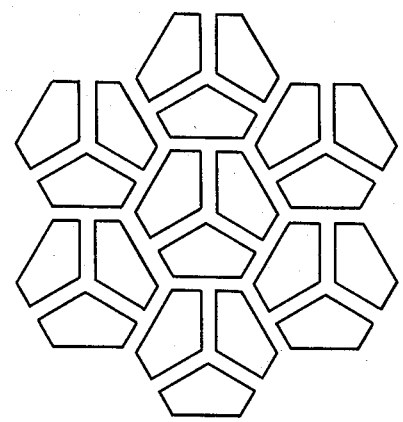

FIGS. 9 through 12 show variance in the examples of patterns which may be employed in the present invention. In FIG. 9, rectangular cavities 72 are employed. In this case, the inside corners of each of the cavities are rounded in order to avoid stress concentration. In FIG. 10, the hexagonal configuration is somewhat amended with more cavities 74 being employed. FIG. 11 shows a pattern of cavities employing large circles 76 and small circles 78. FIG. 12 shows a pattern in which each cavity is a hexagon shape and each cavity is divided into three segments.

With the complicated pattern shapes of any of the disclosed sets of cavities and in view of the difficulty in machining stainless steel, other machining processes may be found to be advantageous. For example, the use of chemical etching and particularly photo etching makes it possible to form cavities on a production basis such as would be required in the production of two-cycle motorcycle engines.

Figure 13:
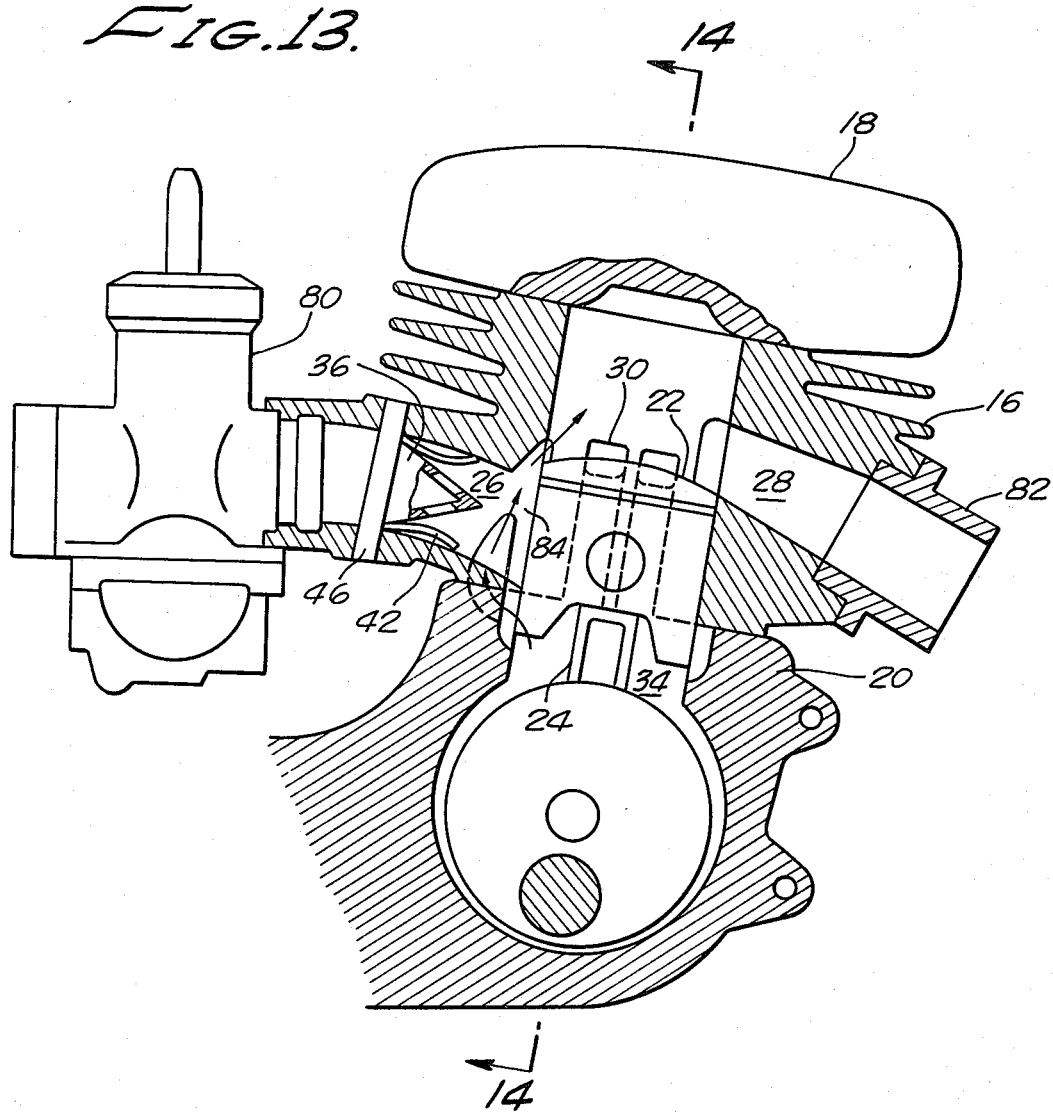
FIG. 13 is another example of a two-cycle engine shown in cross-sectional elevation and employing reed valves.
Figure 14:
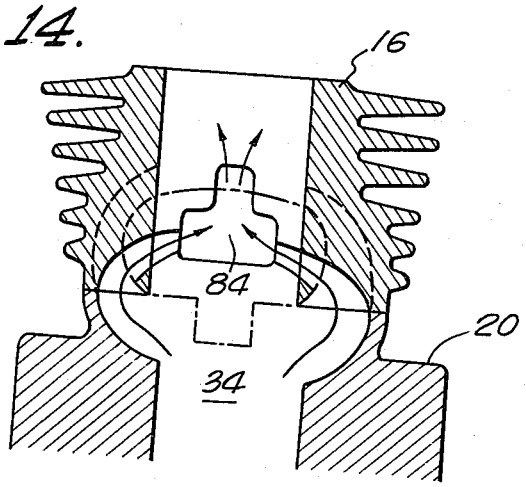
FIG. 14 is a cross-sectional elevation taken along line 14—14 of FIG. 13.

For completeness, FIGS. 13 and 14 illustrate another two-stroke engine with a carburetor attached. The same numbering is employed here as in FIG. 1 for ease of comparison and a carburetor 80 and an exhaust pipe 82 are included. This internal combustion engine provides the joint section of a crank case 20 and a cylinder 16 with an auxiliary scavenging air inlet 84 so as to increase the time of mixture supply and to increase the passage area from the intake port 26 to the compression chamber 34 for improved performance.

As clearly seen from the foregoing details and discussion, a reed valve is provided in accordance with the present invention having a plurality of cavities such that the natural frequency of the valve can be raised for better performance of the valve. This is accomplished without changing the sectional area and weight of the reed valve such that the valve retains its low and mid-range efficiency as well. The valve has been shown in the context of a two-cycle engine. However, the valve has advantageous benefits when used in any high performance requirement.

While embodiments and applications of this invention have been shown and described, it would be apparent to those skilled in the art that many more modifications are possible without departing from the inventive concepts herein described. The invention, therefore, is not to be restricted except by the spirit of the appended claims.

What is claimed is:

1. A reed valve comprising a reed element having a first surface, said first surface including cavities therein, said cavities being discontinuous, one from another, and structurally independent, and a planar peripheral boundary and frame members extending between said discontinuous cavities, said boundary and said frame members having surface continuity there among, said cavities extending into said element to define membranes between said frame members.

2. The reed valve of claim 1 wherein said cavities form a pattern of symmetrical figures in plan.

3. The reed valve of claim 2 wherein said cavities are all of equal depth.

4. The reed valve of claim 1 wherein the natural frequency of the reed element is substantially higher than the normal range of frequency of operation of said reed valve.

5. The reed valve of claim 1 or 4 wherein the natural frequency of the bottom of each cavity is higher than the natural frequency of said reed element.

6. A reed valve comprising a reed element having a first surface, said first surface including cavities therein, said cavities being discontinuous, one from another, and structurally independent, a planar peripheral boundary and frame members extending between said discontinuous cavities, said boundary and said frame members having surface continuity there among, said cavities forming a pattern of symmetrical figures in plan wherein said symmetrical figures are in nested arrangement in said pattern and said pattern terminates at said planar peripheral boundary.

7. The reed valve of claim 2, 3, or 6 wherein said symmetrical figures are polygons having two included angles where said pattern terminates at said planar peripheral boundary.

8. The reed valve of claim 1, 2, 3, or 6 wherein said reed elements include a base holding said reed element, and the sum width of said frame members, as measured in a direction parallel to said base between adjacent cavities in any row thereof, being substantially constant from said planar peripheral boundary nearest said base to the most distal portion of said planar peripheral boundary.

9. The reed valve of claim 8 wherein said frame members are of different widths to maintain said sum width.

10. A reed valve comprising a reed element having a first surface, said first surface including cavities therein, a planar peripheral boundary and frame members extending between said cavities such that said frame member and said boundaries define the extent of said cavities, and a base for holding said reed element, the sum width of said frame members between adjacent cavities in any row of cavities, as measured in a direction parallel to said base, being substantially constant between said boundries.

11. The reed valve of claim 10 wherein said cavities are polygons in plan and arranged in a nested pattern within said peripheral boundary, said polygons having obtuse included angles except for cavities in said nested pattern truncated by said peripheral boundary.

12. The reed valve of claim 10 wherein said peripheral boundary includes parallel ends, a first one of said ends being juxtaposed with said base and a second one of said ends being most distal from said base, and parallel sides extending between said ends, said ends and said sides defining at least one substantially rectangular valve body surface including said cavities and said frame members, the width of said rectangular valve body surface between said sides being equal to the width of two said cavities plus the included frame members.

13. The reed valve of claim 12 wherein said cavities are nested symmetrically in said rectangular valve body surface with at least one said cavity being centrally positioned between said sides.

14. The reed valve of claim 1, 2, 3, 6, 10, 11, 12 or 13 wherein said reed element includes a second surface on the opposite side of said reed element from said first surface, said second surface including cavities and frame members in an identical pattern to said first surface.

15. The reed valve of claim 14 wherein said cavities are all of equal depth.

16. A reed valve comprising a reed element having first and second surfaces, said surfaces including cavities therein, planar peripheral boundaries and frame members extending between said cavities such that said frame members and said boundaries define the extent of said cavities to define patterns of symmetrical figures in nested arrangement, said patterns on said sides being identical, and a base for holding said reed element.

17. The reed valve of claim 16 wherein the pattern on said second surface is offset in a direction perpendicular to said base from the pattern on said first surface by one half the pitch of said patterns.

* * * * *